United States Patent Office 3,151,138
Patented Sept. 29, 1964

3,151,138
COMPOSITIONS FOR CORROSION PREVENTION IN OIL WELLS
Paul W. Fischer, Whittier, Calif., assignor to Union Oil Company, of California, Los Angeles, Calif., a corporation of California
No Drawing. Filed Mar. 10, 1959, Ser. No. 798,342
9 Claims. (Cl. 260—404.5)

This invention relates to compositions and methods for preventing corrosion in oil wells, and in particular concerns oil well corrosion inhibitors especially adapted for use in flooded or other wells which produce a very high proportion of water.

In many of the oil-producing areas of the United States the production of crude oil is accompanied by the production of aqueous brines containing dissolved metal salts, such as sodium chloride and calcium chloride, as well as carbon dioxide and/or hydrogen sulfide. Such brines are highly corrosive with respect to ferrous metals, and are responsible for frequent failures of metallic equipment associated with the well, e.g., the well tubing and casing, sucker rods, pump parts, gathering lines, tanks, etc. A wide variety of materials has been suggested for use as corrosion inhibitors to be introduced directly into the well and admixed with the well fluids before the latter can come into substantial contact with metallic well equipment. However, the number of such materials which is effective in the presence of acidic gases (carbon dioxide and/or hydrogen sulfide) and at the condition of elevated temperature and pressure which exist in deep wells is relatively small. Furthermore, since these latter "heavy duty" inhibitors almost invariably take the form of water-insoluble organic materials, even they do not provide sufficient protection in situations where the well effluent comprises very large amounts of water or brine. Such a situation can arise, for example, when a well becomes flooded, so that various metallic parts thereof are submerged in brine for extended periods of time. The need for a water-soluble or water-dispersible well corrosion inhibitor of the heavy duty type is thus clearly indicated.

The present invention is based on my discovery that amine salts of the general formula:

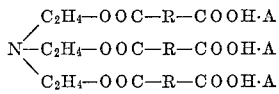

wherein R represents a divalent aliphatic hydrocarbon radical containing from about 16 to about 44 carbon atoms and A represents an aliphatic amine of the class hereinafter defined, are readily soluble or dispersible in water and oil field brines, and are highly effective in preventing the corrosion of ferrous metals by such brines under the conditions of elevated temperature and pressure which exist in deep wells and in the presence of acidic gases. Such compounds are effective in very small amounts and may be introduced directly into the well as such. However, they are usually more conveniently employed in solution or dispersion form, e.g., as petroleum hydrocarbon solutions or as aqueous solutions or dispersions.

As will be apparent, the compounds of the above general formula are amine salts of acidic tri-esters of triethanolamine. The acidic ester is obtained by esterifying the three hydroxyl groups of triethanolamine with a long chain aliphatic dibasic acid. While any aliphatic dibasic acid of the requisite chain length, e.g., cetane dicarboxylic acid, octadecane dicarboxylic acid, eicosane dicarboxylic acid, triacontane dicarboxylic acid, may be employed in forming the triethanolamine tri-ester, I prefer to employ one of the so-called "dimerized fatty acids." the latter term is widely employed in the chemical arts to designate a class of dibasic acids formed by polymerizing to the dimer stage a fatty acid containing at least two ethylene linkages and between about 16 and 22 carbon atoms. The poly-unsaturated acids which can be dimerized to form such dibasic acids include linoleic, linoelaidic, licanic, arachidonic, clupanodonic, eleostearic, etc. In general, the polymerization is carried out simply by heating the monomeric acid at an elevated temperature, e.g., above about 250° C., while avoiding decarboxylation and cracking. U.S. Patent No. 2,482,761 and the Journal of American Oil Chemists Society, vol. 24, page 65 (March 1947) give further details. A typical dimerized fatty acid of this type is available commercially from Emory Industries, Inc., under the tradename "Emery 955 Dimer Acid," and because of its availability is preferred in preparing the present class of corrosion inhibitors. Such product is obtained by dimerizing linoleic acid obtained from vegetable oils, e.g., soya oil, linseed oil, corn oil, etc., and is a viscous liquid containing about 85% of dilinoleic acid, about 12% of trilinoleic acid, and about 3% of the monomer. It has a molecular weight of about 600 and an acid value of about 180–192, and is insoluble in water but soluble in alcohol, ether, benzene, acetone, and petroleum hydrocarbon solvents.

The reaction between triethanolamine and the dibasic acid is a typical esterification reaction carried out in the conventional manner, i.e., by heating a mixture of the two reactants at a suitable reaction temperature while removing water from the system. In order to avoid the formation of di-esters, i.e., products in which both of the carboxyl groups of the dibasic acid are esterified, it is desirable to avoid using an excess of the triethanolamine. Accordingly, at least 3, and preferably between about 3 and 3.5 moles of the acid are provided per mole of triethanolamine. If desired, the reaction may be promoted by means of an esterification catalyst, e.g., benzenesulfonic acid. Usually the reaction proceeds smoothly at temperatures between about 230° F. and about 340° F., and it is complete in from about 2 to 6 hours. At temperatures above about 340° F. insoluble polymers are formed; accordingly, it is preferred to operate at a temperature between about 270° F. and about 320° F. Completion of the reaction is determined either by measuring the water evolved or by determining the acid value of the product. In order to suppress oxidation, the reaction is preferably carried out in an inert atmosphere, and since the reaction mixture and ester product are relatively viscous, an inert reaction solvent, e.g., an aromatic petroleum hydrocarbon solvent, may advantageously be employed to facilitate handling. Such solvent may be removed from the ester product, or it may be allowed to remain therewith and form a part of the ultimate corrosion inhibiting composition.

The amine compound ("A" in the above formula) with which the acid esters are combined to form the salt compounds of the invention are the members of the class consisting of (1) Alkylene polyamines of the formula:

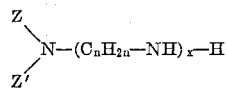

wherein "n" represents a whole number between 2 and 3 inclusive, "x" represents a whole number from 1 to 5 inclusive; and Z and Z' each represents a substituent selected from the class consisting of hydrogen and alkyl radicals containing less than 6 carbon atoms.

(2) Dialkylamines of the formula:

C—NH—C' wherein C and C′ each represents an alkyl group containing from 3 to about 18 carbon atoms.

(3) Amino-alcohols of the formula:

$$HO—C_mH_{2m}—NH—D$$

wherein "m" represents a whole number from 1 to about 8 inclusive, and D represents an alkyl group containing from 4 to about 8 carbon atoms.

Typical examples of the first member of the above class of amines include ethylene diamine, diethylene triamine, triethylene tetra-amine, tetraethylene pentamine, pentaethylene hexamine, propylene diamine, dipropylene triamine, tetraisopropylene pentamine, dimethylamino-ethylamine, dibutylaminopropylamine, dihexylamino ethylamine, N,N′-diethyl-diethylene triamine, etc.

Typical examples of the second member of the above class of amines include di-isopropylamine, di-n-propylamine, di-octylamine, di-octadecylamine, di-hexadecylamine, N-octadecylpropylamine, N-lauryl-octylamine, N-propyl-decylamine, etc.

Typical examples of the third member of the above class of amines include N-butyl-aminomethanol, N-amyl-aminoethanol, N-hexyl-aminopropanol, N-methyl-amino-octanol, N-octyl-aminopentanol, N-hexyl-amino-isopropanol, N-ethyl-1-amino-2-ethylhexanol, N-isobutyl-amino-isobutanol, etc.

The formation of the present class of amine salts takes place spontaneously at ambient temperatures upon admixture of the tri-ester and one or a mixture of the members of the class of amines defined above. In order to insure complete reaction it is usually necessary to effect the reaction in the presence of an inert reaction medium which may be either a solvent or a non-solvent for either or both of the reactants. Hydrocarbon solvents, particularly petroleum hydrocarbons of relatively high aromatics content, are especially suitable. When the amine reactant is fairly soluble in water, the latter may be employed as the reaction medium. Conveniently, the reaction medium not separated upon completion of the reaction but is allowed to remain with the salt and constitute a liquid vehicle therefor so that it may be packaged, shipped and otherwise handled in liquid form. In preparing the salt, the tri-ester and amine reactants are usually employed in chemically equivalent amounts, i.e., three moles of the amine per mole of tri-ester. However, since the tri-ester itself has corrosion inhibiting properties, there is no objection to the presence in the product of even considerable amounts of the free tri-ester. Accordingly, insofar as corrosion inhibition is concerned, the amine reactant may be employed in less than the theoretical amount.

The following examples will illustrate the preparation of a number of the numbers of the present class of water-soluble corrosion inhibiting amine salts, but are not to be construed as limiting the invention:

*Example I*

Three moles of tri-ethanolamine and one mole of di-merized linoleic acid are dissolved in an equal volume of kerosene extract (boiling range=400°–600° F.), and the solution is charged to an oil-jacketed kettle and heated at 320° F. with stirring for about 6 hours by circulating hot oil through the jacket. During the heating period the surface of the reaction mixture is blanketed with nitrogen. Completion of the reaction is indicated by an approximately theoretical reduction in the acid value of the reaction mixture. The reaction product is cooled to room temperature, and three moles of tetraethylene pentamine are added without removal of the kerosene extract solvent. The resulting product is a kerosene extract solution of the compound having the following structure:

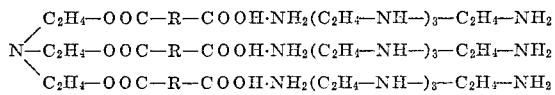

*Example II*

The tri-(dimerized linoleic acid) ester of triethanolamine is prepared as in Example I. After distilling off the kerosene reaction medium under reduced pressure, three moles of N-butylamino-ethanol are added in the form of a 25 weight percent aqueous solution. The resulting product is an aqueous solution of the compound having the structure:

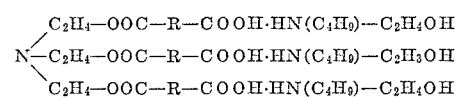

The pure amine salt is obtained as a dark-colored viscous liquid upon evaporating off the water under reduced pressure.

*Example III*

A kerosene extract solution of the tri-(dimerized linoleic acid) ester of triethanolamine is prepared as in Example I. Three moles of di-n-butylamine are added with stirring at room temperature to obtain a kerosene extract solution of the compound of the following structure:

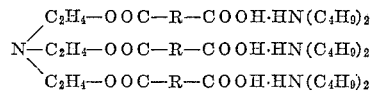

In treating a well to inhibit corrosion therein in accordance with one embodiment of the invention, the inhibitor is simply introduced into the well fluid via the well tubing or casing in an amount sufficient to effect a substantial degree of corrosion inhibition. Such amount will depend primarily upon the nature of the well fluid and the temperatures and pressures prevailing within the well, but highly satisfactory results are usually obtained, even under exceptionally adverse conditions, when the weight of inhibitor in the well is maintained between about 0.001 and about 0.01 percent of the weight of the fluid in the well. The present class of compounds and compositions comprising the same may also be introduced into pipelines, tanks, etc., to reduce the corrosiveness of well fluids in contact therewith.

Since the present class of amine salts are viscous liquids in the pure state, it is usually more convenient to handle and employ them in the form of a solution or dispersion in a suitable liquid solvent or suspending medium. Suitably, such solutions or dispersions will comprise between about 5 and about 95 percent by weight of the amine salt and from about 95 to about 5 percent by weight of the suspending medium. In many instances, the solvent or suspending medium may be an organic solvent, particularly a hydrocarbon solvent derived from petroleum, e.g., an aromatic petroleum distillate or extract fraction. Water may be employed in those instances where the amine salt is sufficiently water-dispersible to permit the formulation of dispersions of the desired concentration; otherwise, the suspending medium may comprise a material which is a mutual solvent for the salt and water. Suitable mutual solvents of this type include low molecular weight ketones, such as acetone, and water-soluble alcohols such as ethylene glycol, diethylene glycol, glycerine, "Carbitol" (mono-ethyl ether of diethylene glycol), "Butyl Carbitol" (mono-butyl ether of diethylene glycol), etc. Mixtures of such mutual solvents and water may also be employed. In addition, the composition may also contain supplementary corrosion inhibitors, scale inhibitors, and other conventional additives.

The following examples are illustrative of typical corrosion inhibiting compositions provided by the invention, but are not to be construed as limiting the invention. The abbreviation "TDT" is employed to designate the dimerized acid tri-ester of tri-ethanolamine.

Example IV

| | Parts by weight |
|---|---|
| Tri-(diethylene triamine) salt of TDT | 50 |
| Ethylene glycol | 50 |
| Water | 50 |

Example V

| | Parts by weight |
|---|---|
| Tri-(diethylamine propylamine) salt of TDT | 22 |
| Isopropyl alcohol | 15 |
| Water | 63 |

Example VI

| | Parts by weight |
|---|---|
| Tri-(di-n-octylamine) salt of TDT | 35 |
| Heavy petroleum reformate | 65 |
| Sodium petroleum sulfonate | 5 |

Example VII

| | Parts by weight |
|---|---|
| Tri-(N-butylaminoethanol) salt of TDT | 10 |
| Water | 90 |

Example VIII

| | Parts by weight |
|---|---|
| Tri-(propylene diamine) salt of TDT | 65 |
| Kerosene extract | 30 |
| Sorbitan tri-oleate (Spen 80) | 5 |

Example IX

| | Parts by weight |
|---|---|
| Tri-(ethylene diamine) salt of TDT | 50 |
| Water | 50 |
| Toluene | 30 |
| Sodium salt of alkylated benzene sulfonic acid | 8 |

Example X

| | Parts by weight |
|---|---|
| Tri-(dilauryl amine) salt of TDT | 10 |
| Water | 70 |
| Methyl ethyl ketone | 25 |

In testing various materials to determine their corrosion inhibiting properties, I have found that test procedures which are carried out at ordinary temperatures and pressures do not reflect acurately the behavior of the test composition in a well. Thus, inhibitors which appear satisfactory when tested by adding the same to an oil well brine and thereafter contacting metal test strips with the inhibited brine at atmospheric pressures and temperatures often prove unsatisfactory when placed in an actual well. Accordingly, I have employed the following rigorous test method which has been found to simulate actual well conditions to a high degree: A 6-inch length of steel sucker rod (1018 steel) is polished with emery, washed and acurately weighed. This test specimen is then mounted in a 4-liter rocking autoclave. A standard test solution is made up by dissolving 1.2 g. of the material to be tested in 100 g. of kerosene. Twelve ml. of the test solution are then dissolved in 200 ml. of kerosene, and introduced into the autoclave. The latter is purged with carbon dioxide, and 3.5 liters of synthetic oil field brine (3% sodium chloride plus small amounts of calcium and magnesium chlorides) from which dissolved air has been removed by purging with carbon dioxide are then introduced into the autoclave. The latter is then pressured up to about 20 p.s.i.g. with carbon dioxide. The simulated well fluid in the autoclave contains about 30 p.p.m. of the material being tested. Kerosene is employed as the hydrocarbon phase of the simulated well fluid since it is not known to contain any of the naturally occurring corrosion inhibitors which are present in some crudes. The autoclave and contents are then heated at 100°–110° C. under autogenic pressure for about 18 hours, after which the autoclave is cooled to room temperature and opened. The test specimen is removed, washed, dried and weighed. The efficiency of the inhibitor is calculated as follows:

$$\text{Efficiency} = \frac{W_1 - W_2}{W_1} \times 100$$

where $W_1$ is the loss in specimen weight with an uninhibited fluid and $W_2$ is the loss in specimen weight with the inhibited fluid. The following table sets forth the results obtained when several of the present class of corrosion inhibitors and compositions were tested in accordance with the foregoing procedure:

| Material tested | Change in wt., mgs. | Eff., percent |
|---|---|---|
| Tri-(n-octadecyl-propylamine) salt of TDT | −3.6 | 99 |
| Tri-(dimethylamino-propylamine) salt of TDT | −7.2 | 98.4 |
| Tri-(di-n-butylamine) salt of TDT | −0.2 | 99.9 |
| Tri-(N-butyl-methanolamine) salt of TDT | −1.2 | 99.9 |
| Tri-(dimethylamino-propylamine) salt of TDT (30% solution in ethylene glycol) | +4.4 | 100 |
| Tri-(dimethylamino-propylamine) salt of TDT (30% solution in carbitol) | +1.4 | 100 |
| Tri-(Polyamine H*) salt of TDT | −30.2 | 92.6 |
| Blank | −415 | 0 |

*Commercial mixture of tetra and higher polyethylene polyamines sold by Carbon and Carbide Chemical Corp.

Other modes of applying the principle of my invention may be employed instead of those explained, change being made as regards the methods or materials employed, provided the compositions or steps stated in the following claims, or the equivalent of such composition or steps, be obtained as employed.

I, therefore, particularly point out and distinctly claim as my invention:

1. Compounds of the general formula:

$$N \begin{cases} C_2H_4-OOC-R-COOH \cdot A \\ C_2H_4-OOC-R-COOH \cdot A \\ C_2H_4-OOC-R-COOH \cdot A \end{cases}$$

wherein R represents the hydrocarbon residue of dimerized linoleic acid, and A represents an aliphatic amine selected from the class consisting of:

(a) alkylene polyamines of the formula:

$$\begin{matrix} Z \\ \phantom{Z}\diagdown \\ \phantom{ZZ} N-(C_nH_{2n}-NH)_x-H \\ \phantom{Z}\diagup \\ Z' \end{matrix}$$

wherein "$n$" represents a whole number from 2 to 3 inclusive, "$x$" represents a whole number from 1 to 5, inclusive, and Z and Z' each represents a substituent selected from the class consisting of hydrogen and alkyl radicals containing less than 6 carbon atoms;

(b) dialkylamines of the formula:

$$C-NH-C'$$

wherein C and C' each represents an alkyl group containing from 3 to about 18 carbon atoms; and (c) amino-alcohols of the formula:

$$HO-C_mH_{2m}-NH-D$$

wherein "$m$" represents a whole number from 1 to 8 inclusive, and D represents an alkyl group containing from 4 to 8 carbon atoms.

2. A compound as defined by claim 1 wherein the aliphatic amine represented by A is an alkylene polyamine of the formula:

$$\begin{matrix} Z \\ \phantom{Z}\diagdown \\ \phantom{ZZ} N-(C_nH_{2n}-NH)_x-H \\ \phantom{Z}\diagup \\ Z' \end{matrix}$$

wherein "$n$" represents a whole number from 2 to 3 inclusive, "$x$" represents a whole number from 1 to 5, inclusive, and Z and Z' each represents a substituent selected from the class consisting of hydrogen and alkyl radicals containing less than 6 carbon atoms.

3. A compound as defined by claim 1 wherein the aliphatic amine represented by A is a dialkylamine of the formula:

$$C-NH-C'$$

wherein C and C' each represents an alkyl group containing from 3 to about 18 carbon atoms.

4. A compound as defined by claim 1 wherein the alphatic amine represented by A is an amino-alcohol of the formula:

$$HO-C_mH_{2m}-NH-D$$

wherein "$m$" represents a whole number from 1 to 8, inclusive, and D represents an alkyl group containing from 4 to 8 carbon atoms.

5. A compound as defined by claim 1 wherein A represents N-butylamino-ethanol.

6. A compound as defined by claim 1 wherein A represents di-n-butylamine.

7. A compound as defined by claim 1 wherein A represents tetraethylene pentamine.

8. A compound as defined by claim 1 wherein A represents n-octadecyl-propylamine.

9. A compound as defined by claim 1 wherein A represents dimethylamino-propylamine.

References Cited in the file of this patent
UNITED STATES PATENTS

| | | |
|---|---|---|
| 2,094,608 | Kritchevsky | Oct. 5, 1937 |
| 2,228,988 | DeGroote et al. | Jan. 14, 1941 |
| 2,430,004 | DeGroote et al. | Nov. 4, 1947 |
| 2,763,612 | Raifsnider et al. | Sept. 18, 1956 |
| 2,805,201 | Fischer | Sept. 3, 1957 |

OTHER REFERENCES

Bergmann: "The Chemistry of Acetylene and Related Compounds," (1948), page 80, Interscience Publishers (N.Y.) QD-305-H8-B44.